US005538644A

United States Patent [19]

Kozak et al.

[11] Patent Number: 5,538,644

[45] Date of Patent: Jul. 23, 1996

[54] APPARATUS AND METHOD FOR MAINTAINING A STABLE BATH FOR AN AUTODEPOSITION COMPOSITION BY PERIODICALLY SEPARATING PARTICULAR METAL IONS FROM THE COMPOSITION

[75] Inventors: William G. Kozak, Hatfield, Pa.; Bashir M. Ahmed, Utica, Mich.

[73] Assignee: Henkel Corporation, Plymouth Meeting, Pa.

[21] Appl. No.: 320,997

[22] Filed: Oct. 11, 1994

Related U.S. Application Data

[63] Continuation-in-part of Ser. No. 8,956, Jan. 26, 1993, Pat. No. 5,393,416.

[51] Int. Cl.[6] .......................... B01D 15/04; B01D 36/00; C09D 109/10; C23C 22/86

[52] U.S. Cl. .......................... 210/669; 118/602; 118/603; 148/251; 210/96.1; 210/143; 210/295; 210/266; 210/670; 210/688; 427/345

[58] Field of Search .................................. 210/96.1, 143, 210/167, 269, 266, 662, 688, 900, 189, 670, 669, 295; 118/602, 603, 400, 429; 427/345; 148/251

[56] References Cited

U.S. PATENT DOCUMENTS

| | | | |
|---|---|---|---|
| 2,628,191 | 2/1953 | Sard | 210/662 |
| 3,123,579 | 3/1964 | Lefevre | 118/603 |
| 3,220,552 | 3/1965 | Staats | 210/96.1 |
| 3,312,189 | 4/1967 | McVey | 118/689 |
| 3,581,894 | 6/1971 | Minart | 210/189 X |
| 3,839,097 | 10/1974 | Hall et al. | 148/251 |
| 4,219,413 | 8/1980 | Jackson et al. | 210/662 |
| 4,269,715 | 5/1981 | Barraqué et al. | 210/675 |
| 4,275,448 | 6/1981 | LeDall | 364/500 |
| 4,303,704 | 12/1981 | Courduvelis et al. | 427/345 |
| 4,568,465 | 2/1986 | Davis et al. | 210/662 |
| 4,668,402 | 5/1987 | Norton | 210/662 |
| 4,863,612 | 9/1989 | Kirman et al. | 210/662 |

FOREIGN PATENT DOCUMENTS

| | | |
|---|---|---|
| 2017026 | 4/1991 | Canada . |
| 48-23655 | 7/1973 | Japan . |
| 57-79197 | 5/1982 | Japan . |
| 62-193652 | 8/1987 | Japan . |

OTHER PUBLICATIONS

Stefan Muller; "Process Control of the Grosshansdorf Waterworks"; *Siemens Review*, vol. XLV, pp. 17–21, 1978.

*Primary Examiner*—Michael W. Ball
*Assistant Examiner*—Francis J. Lorin
*Attorney, Agent, or Firm*—Ernest G. Szoke; Wayne C. Jaeschke; Kenneth Watov

[57] ABSTRACT

An apparatus and method is provided for automated periodic removal of metal ions and contaminants from a chemical bath comprising a latex solution containing charged latex particles and having an acidic pH, used for forming a coating by autodeposition. The system includes a tank containing a chemical bath, an ion exchange column for removing the metal ion contaminants, circulating pump, metal composition sensors, and equipment for regeneration of the ion exchange column. The system particularly includes a filter located at the inlet to the ion exchange column for removing solid particulates, including coagulated latex and debris from the coating solution, while permitting the uncoagulated latex particles to pass through to the ion exchange column.

17 Claims, 4 Drawing Sheets

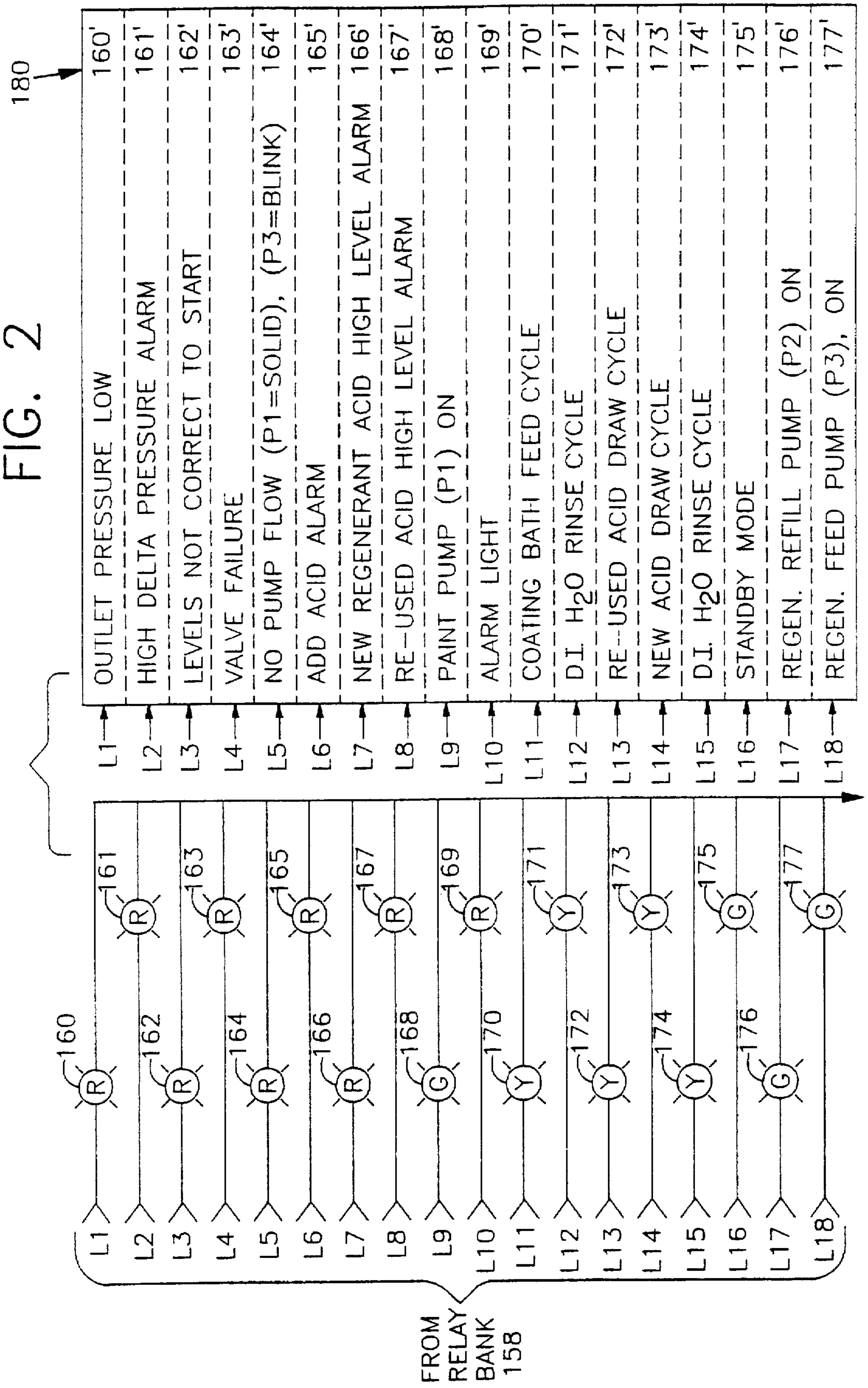

FIG. 2
180
OUTLET PRESSURE LOW 160'
HIGH DELTA PRESSURE ALARM 161'
LEVELS NOT CORRECT TO START 162'
VALVE FAILURE 163'
NO PUMP FLOW (P1=SOLID), (P3=BLINK) 164'
ADD ACID ALARM 165'
NEW REGENERANT ACID HIGH LEVEL ALARM 166'
RE-USED ACID HIGH LEVEL ALARM 167'
PAINT PUMP (P1) ON 168'
ALARM LIGHT 169'
COATING BATH FEED CYCLE 170'
D.I. H2O RINSE CYCLE 171'
RE-USED ACID DRAW CYCLE 172'
NEW ACID DRAW CYCLE 173'
D.I. H2O RINSE CYCLE 174'
STANDBY MODE 175'
REGEN. REFILL PUMP (P2) ON 176'
REGEN. FEED PUMP (P3), ON 177'
L1 L2 L3 L4 L5 L6 L7 L8 L9 L10 L11 L12 L13 L14 L15 L16 L17 L18
160 R
161 R
162 R
163 R
164 R
165 R
166 R
167 R
168 G
169 R
170 Y
171 Y
172 Y
173 Y
174 Y
175 G
176 G
177 G
FROM RELAY BANK 158

APPARATUS AND METHOD FOR MAINTAINING A STABLE BATH FOR AN AUTODEPOSITION COMPOSITION BY PERIODICALLY SEPARATING PARTICULAR METAL IONS FROM THE COMPOSITION

This application is a continuation-in-part of application Ser. No. 08/008,956, filed Jan. 26, 1993, now U.S. Pat. No. 5,393,416, the teachings of which are incorporated herein in entirety by reference, provided any such teachings are not inconsistent with any teachings herein.

RELATED INVENTION

The invention of the present application is related to the commonly assigned invention of co-pending application Ser. No. 08/102,662, filed on Aug. 5, 1993, for "PROCESS FOR SEPARATING MULTIVALENT METAL IONS FROM AUTODEPOSITION COMPOSITIONS AND PROCESS FOR REGENERATING CHELATING TYPE ION EXCHANGE RESINS USEFUL THEREWITH". The teachings of this co-pending application are incorporated into this present application in their entirety by reference, provided any such teachings are not inconsistent with any teaching herein. The invention of the present application is also related to the commonly aligned invention of co-pending application Ser. No. 08/231,075, filed Apr. 22, 1994.

BACKGROUND

1. Field of the Invention

The field of the present invention relates generally to chemical baths in which metal ions build up over a period of time and must be periodically removed, and more particularly to such systems providing for coating materials, such as metals including steel, with a paint coating via a chemical reaction, in which systems an autodeposition composition bath is periodically stabilized by removing therefrom dissolved and/or dispersed multivalent metal ions accumulated over a period of operation.

2. Discussion of Related Art

Autophoresis and electrophoresis are two known processes for coating objects, particularly those fabricated from metallic material, with a coating composition. The electrophoresis effect provides for electrodeposition through the use of an electric field to control the movement of charged organic molecules to a workpiece serving as one electrode of a typically two-electrode system. The magnitude of electrical current and time of application is controlled for coating the workpiece to a desired thickness. The autophoresis effect permits an autodeposition coating process to be carried out via control of the de-stabilization and deposition of high-molecular-weight negative or neutrally-charged latex polymer particles, for example, onto a workpiece having a metallic surface that is chemically treated to produce positively charged ions at the surface of the workpiece which attract the oppositely or neutrally charged particles of coating composition. The parts to be coated are typically dipped into a coating bath containing the desired coating composition. Workpieces of iron, steel, galvanized metal coated with zinc, and so forth, at least about the outer surfaces of the workpiece, can typically be coated via an autodeposition coating process.

A problem in systems carrying out an autodeposition coating process is that over a period of time metal ions having a valence of two or higher (multivalent ions), dissolve and/or disperse into the bath or autodeposition composition, increasingly reducing the effectiveness of the autodeposition coating process. As the metal ions increase in concentration in the autodeposition composition, the quality of the coatings produced on the workpieces diminishes to the point where the coating composition or autodeposition bath must be replaced, or a portion of the bath must be removed and new uncontaminated coating composition added, to reduce the concentration of the metal ions, for permitting the autodeposition coating process to continue.

In order to satisfy a recognized need in the field of the present invention, the present inventors conceived and developed a substantially automated system for periodically removing contaminants from coating composition baths used in autodeposition processing. In designing the present system, the inventors recognized the need to provide that substantially all of the autodeposition bath or coating composition be utilized in coating parts, compared to prior systems which wasted costly quantities of the autodeposition baths due to contamination thereof after a period of use forcing disposal of the same. The present inventors further recognized the requirement to provide a system which substantially minimizes the production of waste products harmful to the environment. By designing a substantially automated system for autodeposition processing, maximum economics are obtained through the use of substantially all of the costly autodeposition bath or coating composition material.

The present inventors recognized that it is contrary to prior teachings to pass any solution containing particulates, such as latex and pigment included in AUTOPHORETIC or autodeposition baths through an ion exchange (IEX) column. They conceived the present system to accomplish this operation, and overcame the problems in the prior art such as clogging of IEX columns by autodeposition baths.

SUMMARY OF THE INVENTION

An object of the invention is to provide an improved system for autodeposition processes.

Another object of the invention is to provide an improved system for autodeposition processes that maximizes the usage of the autodeposition bath, and minimizes the production of harmful waste products.

Yet another object of the invention is to provide a substantially automated system for stabilizing a chemical bath through use of an ion exchange column to remove metal ions from the bath on a periodic basis, and further through periodic cleansing and regeneration of the ion exchange column.

Another object of the invention is to provide multiple reverse or bidirectional flushing or rinsing of the ion exchange column after regenerant fluid is passed there through during a regeneration cycle.

With these and other objects of the invention in mind, the present invention provides for a substantially automated system programmed for periodically stabilizing a chemical bath or an autodeposition bath by passing all or a portion of the bath through a plurality of filters and an ion exchange column, for removing metal ions and other contaminants from the bath that have accumulated therein over a period of time. The system further provides for automatically pumping deionized water from a supply tank through the ion exchange column for returning treated bath from the column back to the storage tank holding the chemical or autodeposition bath. The system periodically provides for regenerating the ion exchange column by passing a regenerant acid through the ion exchange column to remove metal ions collected by the column from the autodeposition bath. Thereafter, the column is then automatically flushed out using multiple reverse flushing operations with deionized water, preferably fluidizing ion exchange resin in the column in an upflow direction of rinsing, to remove the residual acid and particles remaining in the ion exchange column, thereby preparing the ion exchange column for another cycle of cleansing the autodeposition bath of metal ions and contaminants. Waste water and waste regenerant acid is automatically dispensed from the system to a treatment plant, in an environmentally safe manner. In another embodiment of the invention, acid passed through the ion exchange column may be collected in a reuse tank, for reuse in regenerating the ion exchange column, to the extent possible. A controller, such as a microprocessor, for example, is programmed for controlling valving means and pumping means for circulating the autodeposition or chemical bath, the deionized water, and regenerant acid, through the system in a controlled manner. An air operated diaphragm pump is used to pump the autophoretic bath to provide low shear pumping.

BRIEF DESCRIPTION OF THE DRAWINGS

Various embodiments of the present invention are described below with reference to the drawings, in which like items are identified by the same reference designation, and in which:

FIG. 2 is a partial electrical circuit schematic showing a plurality of lamps and/or visual indicators providing alarm indications for one embodiment of the invention.

DETAILED DESCRIPTION OF THE INVENTION

Figures 1, 1A:
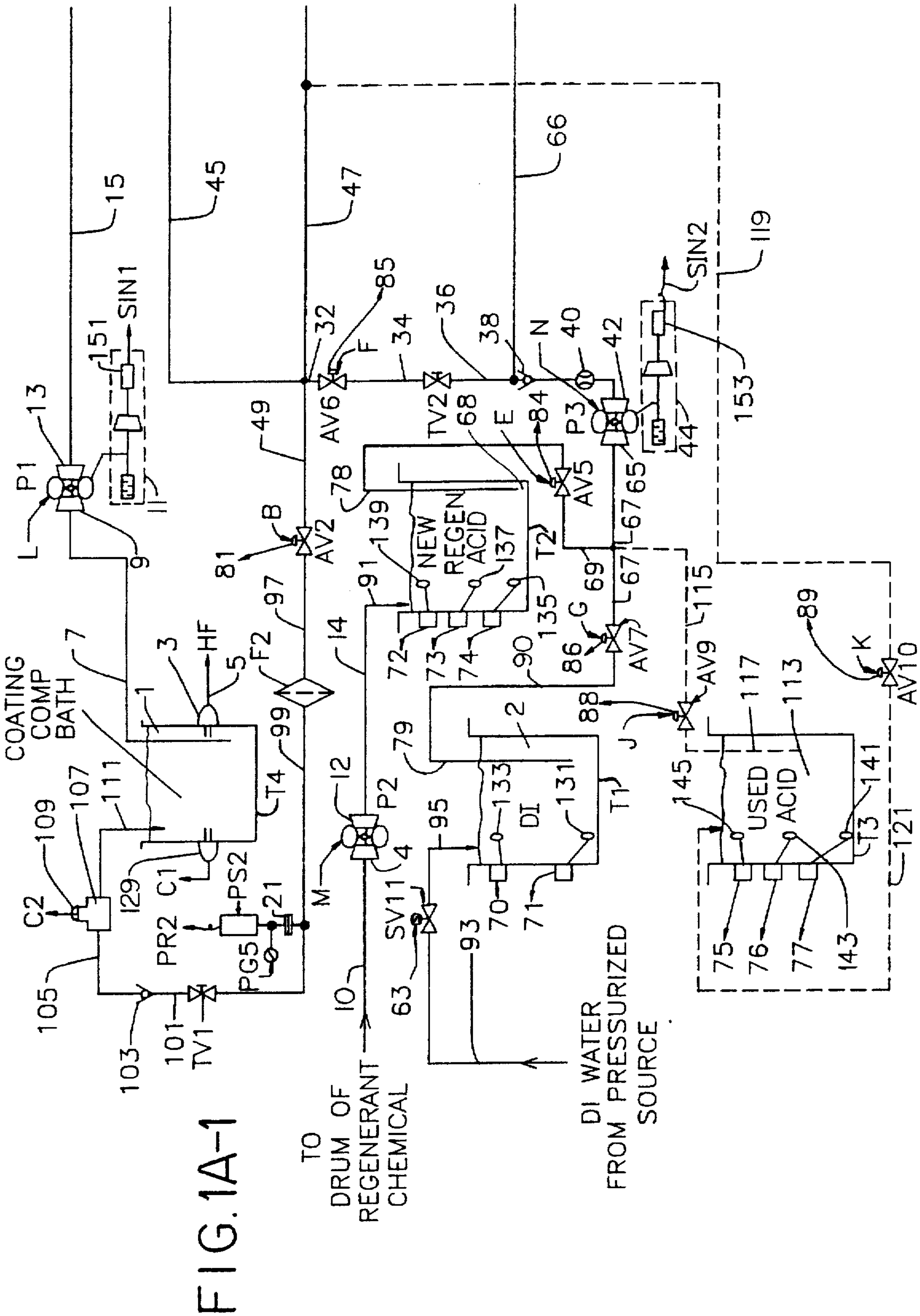
FIGS. 1A-1, 1A-2 and 1B show portions of a flow schematic diagram for one embodiment of the invention.

With reference to FIG. 1, a system is shown for processing a chemical bath, particularly an autodeposition composition in this illustration, to separate therefrom multivalent metal ions through use of a chelating type ion exchange resin 30, and for regenerating the chelating resin 30, all in a periodic and substantially automated manner. As indicated above, a preferred process used in the present system is illustrated and described in detail in co-pending related application Ser. No. 07/847,543, filed on Mar. 6, 1992, entitled "Process For Separating Multivalent Metal Ions From Autodeposition Compositions And Process For Regenerating Chelating Type Ion Exchange Resins Useful Therewith", which is incorporated herein by reference to the extent that teachings therein do not conflict with teachings relative to the present system.

Although the description of the present system is illustrated herein relative to a preferred autodeposition process, the system is not limited to use with autodeposition baths where polymer is involved. The system can be used to periodically remove metal ions, that may build up over time, from many types of chemical baths.

During the autodeposition coating of workpieces, metallic ions from the workpieces accumulate in the coating composition over time due to dissolution from the workpieces. As the concentration of the metallic ions increases in the coating composition bath, a level is reached where the quality of the coatings obtained is negatively affected. Also, the concentration of metallic ions may increase to a level where the coating composition begins to coagulate and become unstable. Accordingly, before such negative performance is reached, it is important to periodically remove the accumulated metal ions from the coating composition bath.

With further reference to FIG. 1, a system for removing metallic ions from an coating composition bath includes a tank T4 containing the coating composition bath 1. For purposes of illustration, assume that the workpieces being passed through the coating composition bath 1 are steel, and that the bath 1 includes hydrofluoric acid (HF) of a given concentration. In an optional embodiment, the concentration of the HF is monitored through use of a transducer 3 immersed in the tank T4. A signal line 5 from transducer 3 transmits an electrical signal having a voltage level proportional to the concentration of HF. A conductivity transducer 129 is immersed in the coating composition bath 1 in tank T4, for providing a signal C1 having a level indicative of the conductivity of bath 1. A draw conduit or pipe 7 has one end deeply immersed in the coating composition bath 1, and another end connected to an input port 9 of an air operated pump P1. An air operated diaphragm pump is preferred for P1 because of the requirement of low shear when pumping an autodeposition bath. A stroke indicator assembly 11 is connected to the pump P1 for providing a signal SIN1 (via a pressure switch 151) indicative of each stroke taken by the pump P1. By monitoring the number of strokes taken by the pump P1 during a given cycle of operation, a measurement of the quantity of coating composition passed through the pump P1 can be obtained. In this example, each stroke of pump P1 pumps 0.016 gallons. An output port 13 of pump P1 is connected by a fluid line or conduit 15 to an inlet port 17 of a filter F1. An outlet port 19 of filter F1 is connected to one end of an automatic air operated valve AV1. Note that the fluid line 15 is connected by a gage isolator 21 to a pressure gauge PG1 monitoring the pressure between pump P1 and filter F1. Also, a pressure sensor PS1 is connected by gauge isolators 21 across filter F1. PS1 is, in this example, representative of a normally open switch when filter F1 is clear causing a low pressure to be developed across PS1. When filter F1 becomes clogged, a pressure is developed across PS1 causing it to respond by closing an internal adjustable switch (not shown) to cause signal PR1 to change state from zero volt to +5 volts, in this example, indicating a clogged filter F1. Accordingly, signal PR1 is indicative of the differential pressure between the inlet port 17 and the outlet port 19 of filter F1 exceeding a predetermined level. Also, a gauge isolator 21 connects another pressure gauge PG2 to fluid line 23, for providing a measurement of the pressure between outlet 19 of filter F1, and one port of automatic valve AV1.

The output port of valve AV1 is coupled through a check valve 25 via a fluid line or pipe 27 to an ion exchange column (IEX) 29, and through another fluid path or pipe 31 commonly connected at one end to pipe 27, to a common connection with a fluid line or pipe 33 connected between fluid ports of automatic valves AV4 and AV8. The other end or port of automatic valve AV4 is connected via fluid line 35 to one end of a throttle valve TV4, the other end of the latter being connected to one port of a tee coupling 37, the other port of the latter being connected via fluid conduit or pipe 39 to treatment apparatus (not shown). A fluid conductivity transducer 41 is installed on the tee 37 for providing a signal C3 indicative of the conductivity of the fluid being discharged or passed therethrough.

A conduit or fluid line 43 is Connected at one end into the fluid path 35 between valves AV4 and TV4, and at its other end to one port of automatic valve AV3. The other end or port of valve AV3 is connected via fluid line 45 to a common connection between the ends of fluid lines 47, 49 and 32, for connections via the other ends of fluid line 47 to a fluid port of ion exchange column (IEX) 29, of fluid line 32 to one port of an automatic valve AV6, and of fluid line 49 to one port of automatic valve AV2. The other port of automatic valve AV6 is connected via fluid line 34 to one port of throttle valve TV2. The other port of throttle valve TV2 is connected via fluid line 36 through a check valve 38 in series with a rotameter 40 to an outlet port 42 of a pump P3. Check valve 38 is oriented for passing fluid from rotameter 40 to throttle valve TV2 or throttle valve TV3. Fluid line 36 is also connected via fluid line 66 to one port of throttle valve TV3, the other port of which is connected via fluid line 65 to the other port of automatic valve AV8.

A stroke indicator 44 is connected to pump P3 for providing a signal SIN2, via a pressure switch 153, indicative of the number of strokes of pump P3 during a given cycle of operation, for providing a measurement of the fluid being pumped therethrough (0.016 gallons/stroke in this example). An inlet port 65 of pump P3 is commonly connected via fluid lines 67 and 69 to fluid ports of automatic valves AV7 and AV5, respectively. The other fluid port of automatic valve AV5 is connected via fluid line 78, which has an open end positioned near the bottom of a tank T2 containing new regenerant acid 68 (HF in this example). The other port of automatic valve AV7 is connected via a fluid line 90 to a suction or draw pipe 79 having a free end positioned within and near the bottom of a tank T1 containing deionized (DI) water 2. The purpose of tank T1 is to allow for an inventory of DI water to be stored, to permit operation of the system in plants where the instantaneous flow rate of the inplant DI water is insufficient to supply the DI water requirements of IEX 29.

A pump P2 has an inlet port 4 connected via a fluid line 10 to a drum of fresh regenerant chemical or acid (not shown). An outlet port 12 is connected via a fluid line 14 to a feedpipe 91, for discharging new regenerant acid 68 into tank T2 during a refill cycle.

An electrically operated solenoid valve SV11 has one fluid port connected via a fluid line 93 to a pressurized source of deionized (DI) water (not shown). The other fluid port of valve SV11 is connected to a fluid feed line 95, for discharging from the latter DI water into tank T1, during a refill cycle therefor.

Another fluid port of automatic valve AV2 is connected via a fluid line 97 to an inlet port of a filter F2. An outlet port of filter F2 is connected via fluid line 99 to one port of a throttle valve TV1. A gauge isolator 21 is used to connect both a pressure gauge PG5 and a pressure switch PS2 to fluid line 99, as shown. PS2 is representative of a normally open switch (not shown) with no applied pressure. When F2 is clogged, low back pressure causes the associated signal PR2 to be at zero volt. PS2 responds to the pressure drop across TV1 falling below a preset valve, as a result of clogging of F2. In other words, pressure switch PS2 provides a signal PR2 when the pressure in fluid line 99 or at the outlet of filter F2 falls below a predetermined value. The other port of throttle valve TV1 is coupled via fluid line 101 to an inlet end of a check valve 103, the outlet port of the latter being connected via a fluid line 105 to one port of a tee coupling 107. A conductivity transducer 109 is mounted on the tee coupling 107, for providing a conductivity signal C2 indicative of the conductivity of the fluid passing through the tee coupling 107. The other end of the tee coupling 107 is connected to a feedpipe 111 for discharging treated coating composition 1 back into tank T4, as will be described in detail below.

Another embodiment of the present inventive system (shown in phantom) is considered optional, and includes a tank T3 for containing once used regenerant acid 113. This embodiment further includes a fluid line 115 connected between the common connection of fluid lines 67 and 69, and one port of automatic valve AV9. The other port of automatic valve AV9 is connected to one end of fluid line 117, the other end of which is located within and near the bottom of tank T3. A fluid line 119 has one end connected to fluid line 47, and another end connected to one port of an automatic valve AV10. The other fluid port of valve AV10 is connected via a fluid line 121 for discharging once used regenerant acid 113 into tank T3, as will be described below.

A source of air (not shown) provides "shop air" of controlled pressure via conduit or pipe 123 to an inlet port of a regulator filter F3, the outlet port of which is connected via air pressure line 125 to a plurality of solenoid operated valves SV1 through SV10, and SVP1 through SVP3, respectively. These valves are individually controlled by a controller 127 via electrical control signals 50 through 62, respectively, generated by controller 127 at appropriate times, as will be described in detail below. When solenoid valves SV1 through SV10 are individually energized, in this example they open to provide air pressure signals A,B,C,D, E,F,G,H,J, and K, respectively, which air pressure signals are individually coupled to automatic air operated valves AV1 through AV10, respectively, for opening these valves. Similarly, when solenoid valves SVP1, SVP2, and SVP3, are individually energized by controller 127, these valves open to provide air pressure signals L,M,N, respectively, for application to pumps P1, P2, P3, respectively, for energizing these air operated pumps, in this example.

A low level sensor 131 is positioned within and near the bottom of tank T1, for providing a signal 71 indicative of the fluid level in tank T1 dropping to below a predetermined low level. Also, a high level sensor 133 is located within tank T1 at a predetermined level below the top of the tank, for providing a +5 volt level signal 70, in this example, indicative of the DI water level reaching the position of level sensor 133. Note that in this example, switches associated with level sensors 131 and 133, and others discussed below, are normally-open switches. All such level sensors, as described herein, produce a level signal of zero volt when liquid is below the level of the associated level sensor, and a level signal +5 volts when liquid is at or above the level of the associated level sensor, for example.

Tank T2 includes a low level sensor 135 located within or near the bottom of the tank, for producing a low level signal 74 of zero volt indicative of the acid therein dropping to below the level of the sensor 135; a mid level sensor 137 for producing a signal 73 of zero volt, whenever the acid level drops to below the level of this sensor; and a high level sensor 139 located near the top of tank T2, for producing a level signal 72 of +5 volts, in this example, indicative of the acid within the tank attaining the level of sensor 139. In substantially the same manner as tank T2, tank T3 includes a low level sensor 141 for producing a low level signal 77, a mid level sensor 143 for producing a mid level signal 76, and a high level sensor 145 for producing a high level signal 75.

During automatic control of the system of FIG. 1, the controller 127 responds to the liquid level signals 70 through 77, valve status signals 80 through 89, pressure signals PR1 and PR2, conductivity signals $C_1$ through $C_3$, and stroke pulse signals SIN1 and SIN2, for providing SV control signals 50 through 63, when required for different modes of operation of the system. These modes of operation are described in detail below.

The ion exchange column 29 is provided by a vinyl ester tank about twelve inches in diameter, and 38 inches in length, in this example. It has its longitudinal axis vertically oriented. The ion exchange column 29 is filled with an appropriate ion exchange resin 30, in this example Amberlite® IRC-718 (manufactured by Rohm & Haas Co., Pennsylvania). Other examples of suitable IEX resins 30 include Miles/Bayer Lewatit TP-207, Purolite S-930, Sybron Ionac SR-5, Bio-Rad Chelex 20 or Chelex 100, Mitsubushi Kasei Diaion CR11, and other similar iminodiacetate based resins. This resin 30 permits ferric and ferrous iron ions to be removed from coating composition 1 passed through the ion exchange column 29, in this example. Other types of resins are available for removing other metallic ions, such as those of chromium or zinc, for example. In this example, the regenerant acid 68 is hydrofluoric acid in greater than 1% concentration.

Note that the automatic air actuated valves AV1 through AV10 each include pairs of output or valve status signals 80 through 89, respectively, for providing an active signal indicative of the valve's present position, that is indicative of either an open or a closed position. As shown, controller 127 senses the status of each valve through monitoring of these pairs of signals 80 through 89. As a result of such signal monitoring, the solenoid valve control signals 50 through 63 are outputted by controller 127 at appropriate times for conducting various modes of operation of the present system. Also, controller 127 can test valves AV1 through AV10 for proper operation through monitoring of these signals.

Figures 1, 1A, 2:
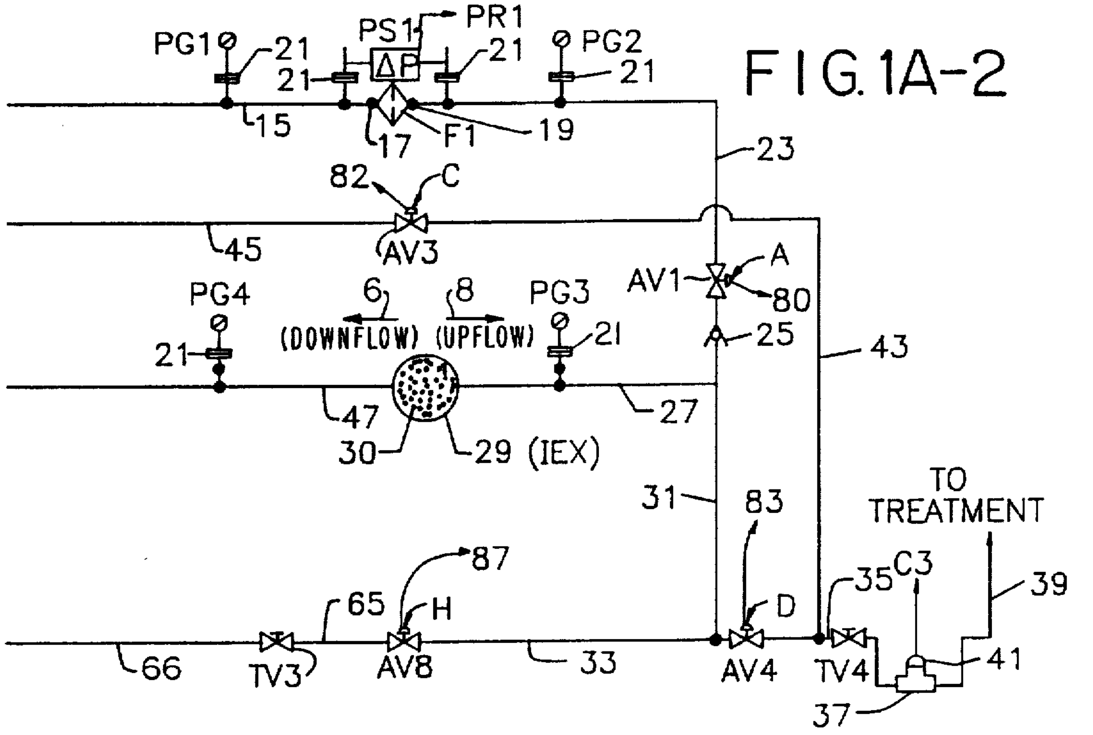
Figure 1B:
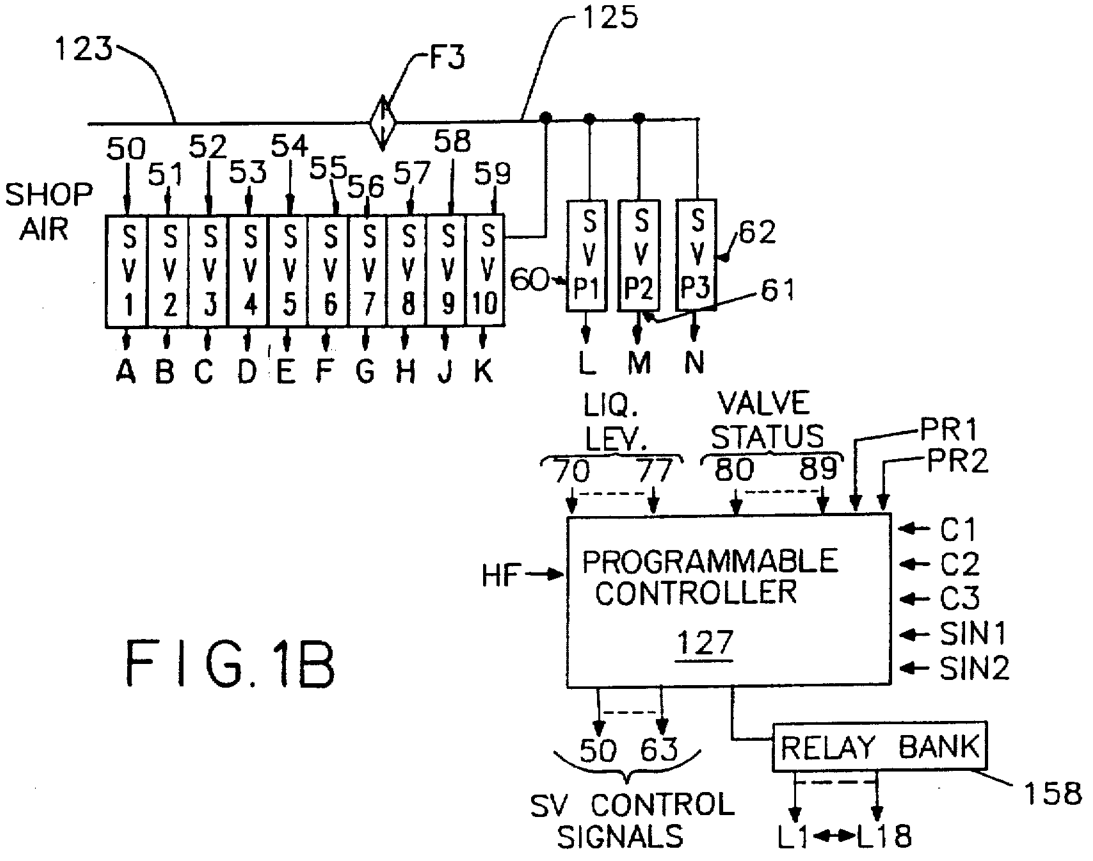

In another embodiment of the invention, a visual alarm system is provided. Controller 127 drives a relay bank 158, for energizing associated relays to provide lamp signals L1 through L18 at appropriate times. In FIG. 2, lamps 160 through 177 are responsive to lamp signals or voltages L1 through L18, respectively, for lighting to provide a visual indication of an associated panel message indicating a particular component or system operation, or showing a defaulting component or system operation, as indicated by the respective legends shown. In this example, lamps with an "R" designation are red in color, those with a "G" designation are green, and those with a "Y" designation are yellow. However, any desired combination of colors can be used for the lamps 160 through 177. In one embodiment, the lamps 160 through 177, as shown in FIG. 2, are individually associated with message displays 160' through 177' of a backlit display panel 180. Alternatively, in another embodiment, the lamps 160 through 177 are mounted on a display panel each adjacent to an associated printed alarm or component operation message 160' through 177', respectively, as shown for the backlit panel 180. In the alternative embodiment, the lamps 160 through 177, respectively, are energized to light adjacent to their associated message display 160' through 177', respectively. In an engineering prototype for the present system, the latter embodiment is used. Note that the alarms are provided, in this example, for permitting a low skilled operator to correct problems that may occur during operation of the system.

Figure 3:
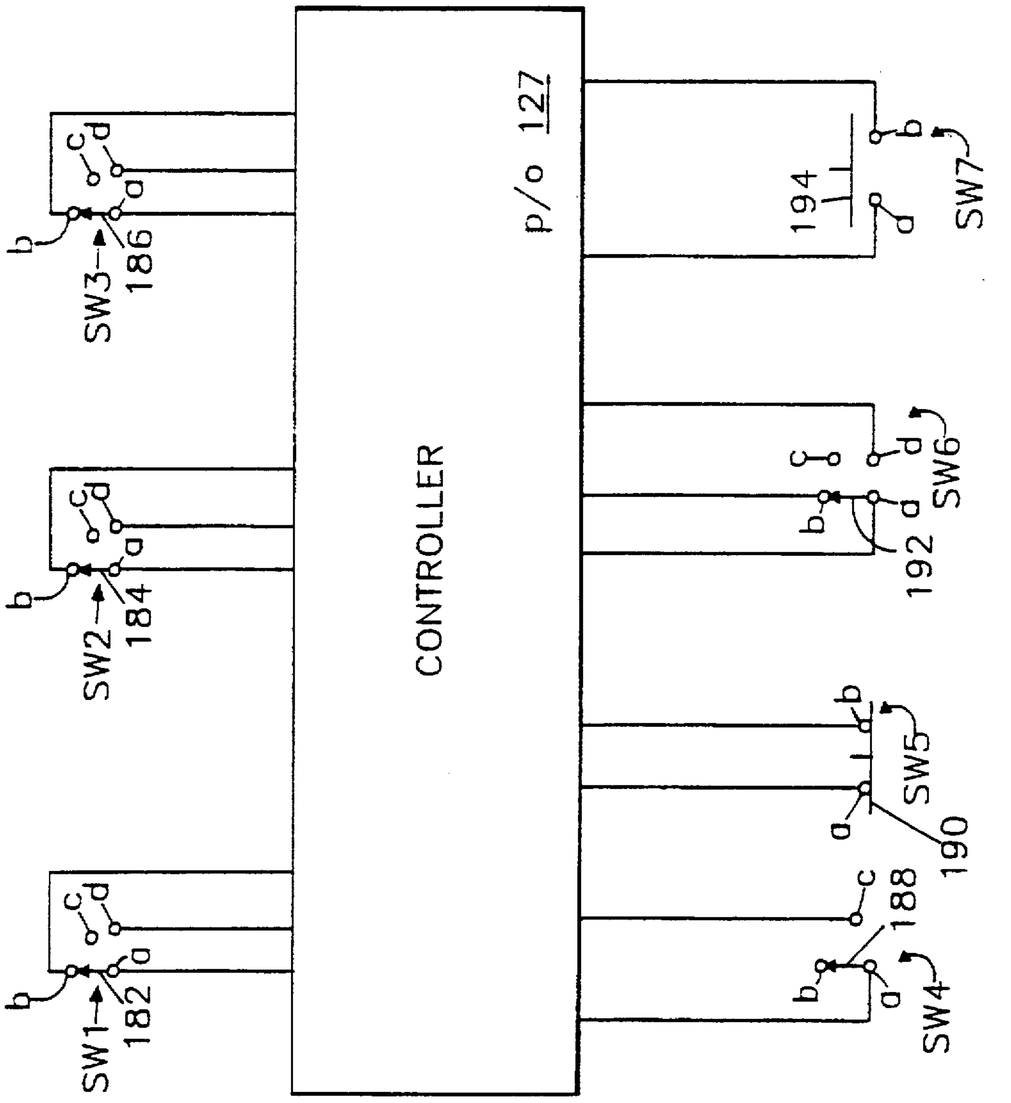
FIG. 3 shows a layout diagram for a plurality of switches for one embodiment of the invention.

In FIG. 3, seven switches SW1 through SW7 are shown with connections to controller 127. In this example, switches SW1 through SW3 and SW6 are three position rotary switches. Switch SW4 is a two position rotary switch. Switch SW5 is a normally closed push button switch, and switch SW7 is a normally open push button switch. These switches are typically located on a control panel in the system Contacts "a", "b", and "d" of switches SW1, SW2, SW3, and SW6 are connected to controller 127, as shown. Contacts "a" and "c" of switch SW4 are connected to controller 127. Contacts "a" and "b" of each of switches SW5 and SW7 are connected to controller 127.

The programming of controller 127 in response to different positions of switches SW1 through SW7 will now be described. Switch SW1 is identified on a control panel (not shown) as a "Regeneration/DI Water Pump Switch P3". When the arm 182 of this switch is rotated to electrically connect contacts "a" and "b" SW1 is in an indicated "ON" position. Controller 127 responds by energizing solenoid valve SVP3, opening the valve to cause air pressure signal N to be applied to pump P3, energizing this pump. However, such action will only occur if switch SW3, designated as the "SYSTEM CONTROL" is operated by rotating its arm 186 for electrically connecting either contacts "a" and "b" or contacts "a" and "d". If the arm 182 of switch SW1 is positioned for electrically interconnecting its contacts "a" and "c" this is a designated "OFF" position, in which pump P3 cannot be energized. When arm 182 is rotated to electrically connect contacts "a" and "d" this position is designated as the "AUTO" position, for programming pump P3 to be energized at appropriate times during various programmed sequences.

Switch SW2 is designated as the "PAINT PUMP P1" switch. When its arm 184 is rotated to electrically connect associated contacts "a" and "b", the switch is in a designated "ON" position, provided that SYSTEM CONTROL switch SW3 is not in its "OFF" position (arm 186 electrically connecting contacts "a" and "c" thereof). When switch arm 184 is rotated to electrically connect contact "a" to contact "c", this is designated as the "OFF" position for SW2, in which pump P1 is prevented from being energized. When switch arm 184 is rotated to electrically connect associated contacts "a" and "d", this is designated as the "AUTO" position, in which pump P1 is energizable at appropriate programmed times during automatic operation of the system, to be described below.

Switch SW3 is designated as a "SYSTEM CONTROL" switch. When its arm 186 is positioned for electrically connecting contacts "a" and "b" thereof, this is designated as the "AUTO" position, and controller 127 in response thereto is programmed to place the system in automatic operation. When switch SW3 has its arm 186 rotated to electrically connect associated contacts "a" and "c", the switch is in a designated "OFF" position, preventing operation of the system. When arm 186 is rotated to electrically connect associated contacts "a" and "d", this is designated as the "PB START" position. When switch SW3 is in this position, controller 127 is programmed to respond to activation of push button switch SW7 by depression of push button contact 194 thereof, for interconnecting associated contacts "a" and "b". Controller 127 is programmed to respond to the latter switch operation by initiating one cycle of treatment of the coating composition 1, as will be described in detail below.

With further reference to "SYSTEM CONTROL" switch SW3, when this switch is placed in its "AUTO" position by moving its arm 186 to electrically connect associated contacts "a" and "b", the programmed treatment of the coating composition 1 will be cyclically repeated at predetermined intervals of time. When "SYSTEM CONTROL" switch SW3 has its arm 186 positioned for electrically connecting associated contacts "a" and "c", in an "OFF" position, the system is placed in a manual mode of operation, and an operating cycle will be stopped. However, controller 127 is programmed to respond thereto by first checking to determine whether any paint or coating composition 1 remains in the ion exchange column 29. If the answer is "yes", controller 127 is programmed to continue the portion of the sequence for operation of the system for pumping coating composition 1 through the ion exchange column 29. If controller 127 determines that for the operating cycle stopped when the system switch SW3 was moved to its "OFF" position, the pumping of coating composition 1 through the ion exchange column 29 had previously been terminated, controller 127 is programmed to initiate a cycle of operation for flushing out the ion exchange column 29 with deionized water 81, as described in detail below. After this flushing cycle, the controller 127 is programmed to initialize itself for resetting all parameters in the system to prepare for responding to the "SYSTEM CONTROL" switch SW3 either being operated by moving its associated arm 186 to electrically connect associated contacts "a" and "d", thereby placing switch SW3 in its designated "PB START" position, or being operated by moving its associated arm 186 to electrically connect associated contacts "a" and "b", thereby placing S3 in its designated "AUTO" position. When "SYSTEM CONTROL" switch SW3 is moved to its "PB START" position, as previously mentioned, controller 127 is thereafter programmed to respond to energization of the "START CLEAN-UP SEQUENCE" push button switch SW7, in this example.

Switch SW4 is designated as the "REGEN CHEMICAL PUMP P2". In the "OFF" position of this switch, its arm 188 is positioned for electrically connecting associated contacts "a" and "b". In this "OFF" position, pump P2 cannot be energized, and controller 127 is programmed to reset a refill cycle for refilling tank T2 with new regenerant acid or chemical regenerant 68, as will be described in detail below. Switch SW4 is placed in a designated "AUTO" position when its arm 188 is rotated to electrically connect associated contacts "a" and "c". In this position, pump P2 can be energized to refill tank T2 with new regenerant chemical or acid under the control of controller 127, which will de-energize pump P2 upon sensing the level of acid in the tank reaching a predetermined filled level. In this example, controller 127 is programmed to not in any event permit the pump P2 to be operated for more than a 30 minute period of time in a given refill cycle.

Switch SW5 is designated as an "EMERGENCY STOP" switch. When the push button 190 of this switch is depressed, the electrical connection between associated contacts "a" and "b" is broken, and the switch SW5 mechanically maintains this position. Controller 127 is programmed to respond to the operation of the emergency stop switch SW5 by first checking to see if the switch has been manually returned to its inoperative position by being pulled outward, in which case if a treatment cycle had been interrupted, that cycle will be resumed from where it was previously interrupted. However, if controller 127 determines that the "EMERGENCY STOP" switch SW5 remains activated, system operation will be terminated, but the system will not be reset. Next, all alarms (to be described in detail below) will be reset except for outlet pressure low alarm 160, 160', high delta pressure alarm 161, 161', no pump flow alarm 164,164', and valve failure alarm 163, 163'. Subsequently, if the "EMERGENCY STOP" switch SW5 is deactivated, controller 127 will then resume the cycle of operation previously interrupted, as mentioned earlier.

Switch SW6 is designated as a "DI MAKE-UP" switch. The switch has three positions, one with arm 192 rotated to electrically connect associated contacts "a" and "b" designated as an "ON" position. An "OFF" position is provided with contact arm 192 rotated to electrically connect associated contacts "a" and "c". Lastly, an "AUTO" position is provided with arm 192 rotated to electrically connect associated contacts "a" and "d". When this switch is in its "ON" position, controller 127 responds by outputting control signal 63 to energize or open solenoid operated valve SV11, for permitting deionized water to begin refilling tank T1, assuming it requires such refilling. If switch SW6 is in its "OFF" position, controller 127 is programmed to inhibit operation of valve SV11. When switch SW6 is placed in its "AUTO" position, controller 127 is programmed to open valve SV11 if tank T1 has a DI water level below the high or fill level sensed by level sensor 133. During such a refill operation, in this example, controller 127 is programmed to turn off valve SV11 upon sensing signal 70 indicative of tank T1 being filled.

Switch SW7 is designated as a "START CLEAN-UP SEQUENCE" push button. When this momentary contact push button switch is depressed, controller 127 is programmed to respond to the electrical connection of contacts "a" and "b" thereof via contact push button arm 194, by first checking to determine if the "EMERGENCY STOP" push button switch SW5 is pushed in or activated. If the answer is "yes", controller 127 is programmed to activate or turn on all panel lamps 160 through 177, for alerting the operator that the emergency "STOP" push button SW5 is activated in addition to serving as a lamp test signal for the controller. However, if the emergency "STOP" push button SW5 is not so activated, controller 127 will then check to determine if the SYSTEM CONTROL switch SW 3 is positioned in its "PB START" position. If the answer is "yes", controller 127 will proceed to initiate one entire cycle of treatment of the coating composition 1, for removing metallic ions therefrom. However, if the answer is "no" controller 127 is programmed to then check to determine if the system control switch is in its "OFF" position. If the answer is "yes", controller 127 will run a valve failure test. The air operated valves AV1 through AV10 are each provided with an associated lamp (not shown), that controller 127 is programmed to energize in a flashing or blinking manner when any of the associated valves are tested to be inoperative. Alternatively, if controller 127 senses that the "SYSTEM CONTROL" switch SW3 is not in its "OFF" position, but in its "AUTO" position, controller 127 will initiate repetitive or periodic cycles of treatment of the coating composition 1.

Operation of the system-will now be described. The controller 127 includes a microprocessor that is programmed for providing stabilization of the coating composition bath 1, by periodically circulating a portion of the coating composition from tank T4 through the ion exchange column 29 (in a downflow direction as indicated by arrow 6) and back to tank T4 after treatment. For setting the system into an automatic mode of operation, an initialization process or mode of operation must first be conducted. The steps for the initialization mode of operation are as follows:

1. Manually place the regeneration pump switch SW1 in its "AUTO" position.
2. Manually place the paint pump switch SW2 in its "AUTO" position.
3. Manually pull the emergency "STOP" switch SW5 out to its inactive position.
4. Manually place the regen chemical pump switch SW4 in its "AUTO" position.
5. Manually place the DI MAKE-UP switch SW6 in its "AUTO" position.

6. Controller 127 checks the status of high level signal 70 to determine whether DI water level in tank T1 is at high level. If not, controller 127 is programmed to apply control signal 63 to valve SV11, for refilling tank T1 with DI water until level signal 70 is sensed, whereafter control signal 63 is terminated and the next step pursued.
7. Controller 127 checks for the presence of level signal 74 to determine if the new regenerant acid in tank T2 is above a predetermined low level. If it is not, controller 127 generates control signal 61, for opening solenoid valve SVP2, to supply air signal M to pump P2, for energizing that pump to refill acid into tank T2. When controller 127 senses the presence of level signal 72, control signal 61 is terminated, closing valve SVP2, thereby turning off pump P2.
8. Manually set the system control switch SW3 to either its "AUTO" or "PB START" positions, or leave the switch SW3 in its "OFF" position.
9. If system control switch SW3 is in its "OFF" position, the system is in a manual mode of operation, and resets to the beginning of a treatment cycle for coating composition 1.
10. If the system control switch SW3 is not in its "OFF" position, is it in its "PB START" position? If the answer is "yes", proceed to next step, if "no", switch SW3 is "AUTO" position. Proceed to step 14.
11. Manually press the "START CLEAN-UP SEQUENCE" switch SW7 to cause the system to run the following complete process sequence once, then stop sequencing and return system to "STAND BY".
12. Pumps P1, P2, and P3 are de-energized, and stroke counters 11 and 44 for P1 and P3, respectively, are reset.
13. Valves AV1 through AV8 are sequentially cycled to test the operation thereof, and to reset all valve operators to "closed" positions, before proceeding to the next mode of operation for coating bath 1 circulation.
14. If the "SYSTEM CONTROL" switch SW3 is in its "AUTO" position, controller 127 is programmed to automatically and periodically run the system through a "FEED/REGEN SEQUENCE", with the sequence being repeated a predetermined number of hours after each such cycle of operation.
15. After a predetermined period of time, go to step 12, perform steps 12 and 13, and proceed to the next mode, Mode II of operation.

After the initialization Mode I of operation, controller 127 is programmed to proceed with Mode II of operation in a preferred embodiment of the invention, for circulating coating composition 1 in a downflow direction (see arrow 6) through ion exchange column 29, via the following steps:

1. To initiate the displacement of DI water from IEX column 29, produce control signals 50 and 52 for opening valves AV1 and AV3, respectively.
2. Produce control signal 60 for opening SVP1, to provide air signal L for energizing pump P1 to pump a predetermined number of gallons of coating composition 1 into IEX column 29, to displace DI water therefrom (each stroke sensed by counting associated pulses of signal SIN1 represents 0.016 gallons).
3. Pump P1 draws coating composition bath or paint 1 from T4, and feeds it through filter F1, for removing coagulated paint and debris from the paint 1, to protect IEX column 29.
4. The voltage level of signal PR1 is sensed to detect any clogging of filter F1.
5. Coating composition 1 passes through valve AV1, and check valve 25, and therefrom enters IEX column 29 in a downflow direction 6, displacing DI water as it enters IEX column 29.
6. DI water being displaced, flows from IEX column 29, through valve AV3, and throttle valve TV4 (latter manually set for a predetermined flow rate).
7. Discharge displaced DI water through tee coupling 37 to waste treatment facility, or for collection for waste treatment.
8. Terminate control signal 52, for turning off SV3, thereby terminating air control signal C, for closing valve AV3, but keep valve AV1 open.
9. Initiate programming for providing steps for circulating coating composition bath or paint 1 through IEX column 29, and returning the treated paint 1 back to tank T4.
10. Produce control signal 51 to open valve SV2, for providing air control signal B to open valve AV2.
11. Circulate coating composition 1 from tank T4, through pump P1, through filter F1, valve AV1, check valve 25, downflow 6 through IEX column 29, through valve AV2, filter F2, throttle valve TV1 (set for a given flow rate), through check valve 103, tee coupling 107, for discharge back into tank T4.
12. Monitor the voltage level of signal PR1 for clogging of filter F1, whereby if PR1 goes to +5 volts, for example, activate alarm light L2 to inform operator to replace filter F1, after this cycle is completed for removing metal ions from coating composition 1.
13. Monitor the voltage level of pressure signal PR2, whereby if signal goes to +5 volts, for example, activate alarm light L1 to inform operator to replace filter F2, after this treatment cycle is completed.
14. After counting a predetermined number of strokes for pump P1, indicative of a predetermined quantity of coating composition 1 being passed through IEX column 29, terminate control signal 60 for turning off pump P1.
15. Reset counter (not shown) in software programming which is incremented by stroke counter 11.
16. Terminate control signal 50, for closing valve AV1.
17. Go to Mode IIIA.

In the next two modes of operation, Modes IIIA and IIIB, controller 127 is programmed to first downflow rinse or flush, and then upflow flush or rinse, respectively, the IEX column 29 with deionized water. Mode IIIA includes the following steps:

1. To initiate the displacement of residual coating composition 1 from IEX column 29, continue to generate control signal 51 for keeping valve AV2 open, concurrent with generating control signals 56 and 57, causing valves SV7 and SV8, respectively, to open, producing air signals G and H, respectively, in turn causing valves AV7 and AV8, respectively, to open.
2. Generate control signal 62 for opening valve SVP3, producing air signal N, for energizing pump P3.
3. Draw DI water from tank T1, through valve AV7, pump P3, rotameter 40, check valve 38, throttle valve TV3 set for a given flow rate, valve AV8, into IEX column 29 in a downflow direction 6, for forcing residual coating composition therefrom through valve AV2, filter F2, throttle valve TV1, check valve 103, and tee coupling 107, for discharge into tank T4.

4. During such circulation, monitor pressure signal PR2, and if this signal changes state, such as going from zero to +5 volts, for example, activate alarm light L1 to inform operator to replace filter F2, after completing this cycle of operation.
5. Through monitoring of signal SIN2, count the number of strokes of pump P3, for determining when to proceed to step 6.
6. Terminate control signal 51 for turning off valve AV2, while maintaining control signals 56 and 57 for keeping valves AV7 and AV8 turned on.
7. Initiate the next cycle for downflow flushing out IEX column 29 with DI water, by first generating control signal 52, for turning on valve SV3, for producing air control signal C, for opening valve AV3.
8. Count the pulses of the associated stroke indicator signal SIN2 while drawing DI water 2 from tank T1, through valve AV7, pump P3, rotameter 40, check valve 38, throttle valve TV3, valve AV8, through IEX column 29 in a downflow direction 6, therefrom through valve AV3, through throttle valve TV4, and tee coupling 37, for discharge out of the system for treatment.
9. After a given quantity of DI water 2 has been passed through IEX column 29 in downflow direction, terminate control signal 62 for turning off P3.
10. Terminate control signals 52, and 57, for turning off valves AV3, and AV8, respectively, while leaving valve AV7 turned on, for ending Mode IIIA.
11. Go to Mode IIIB.

1. Initiate Mode IIIB for upflow flushing out IEX column 29 with DI water, by first generating control signals 53 and 55, for turning on valves SV4 and SV6, for producing air control signals D and F, for opening valves AV4 and AV6, respectively;
2. Generate control signal 62 for opening valve SVP3, producing air signal N, for energizing pump P3.
3. Count the pulses of the associated stroke indicator signal SIN2 while drawing DI water 2 from tank T1, through valve AV7, pump P3, rotameter 40, check valve 38, throttle valve TV2, valve AV6, through IEX column 29 in an upflow direction 6, therefrom through valve AV4, through throttle valve TV4, and tee coupling 37, for discharge out of the system for treatment.
4. After a given quantity of DI water 2 has been passed through IEX column 29 in upflow direction, terminate control signal 62 for turning off P3.
5. Terminate control signals 53, 55, and 56, for turning off valves AV4, AV6, and AV7, respectively.
6. Go to Mode IV.

In one embodiment of the invention, which is optional, a fourth mode of operation is next entered into for initiating the regeneration of the resin 30 in IEX column 29 by first circulating once used acid 113 from tank T3 through IEX column 29 in a downflow direction (see arrow 6). This optional Mode IV comprises the following steps:

1. Monitor level signals 75, 76, and 77, and if at any time during this mode the level of used acid in tank T3 drops below a predetermined low level as indicated by level signal 77, terminate this mode of operation, and transfer to Mode V.
2. Generate control signal 58 to open valve AV9.
3. Generate control signal 57 for opening valve AV8.
4. Generate control signal 52 for opening valve AV3.
5. Generate control signal 62 for energizing pump P3.
6. Monitor SIN2 for counting the number of strokes of pump P3 for a predetermined number of strokes, for permitting a predetermined quantity of used acid 113 to circulate from tank T3, through the flowpath including in series succession valve AV9, pump P3, rotameter 40, check valve 38, throttle valve TV3, valve AV8, IEX column 29 (downflow circulation 6 therethrough), valve AV3, valve TV4, and tee coupling 37 from which the reused acid 113 is discharged from the system for treatment.
7. Terminate control signal 62 with the occurrence of either one of a predetermined number of strokes of pump P3, or the level of used acid in tank T3 dropping to a low level as indicated by level signal 77 going from +5 volts to zero volt, in this example.
8. Terminate control signal 58 for closing valve AV9.
9. Terminate control signal 52 for closing valve AV3.
10. Continue to generate control signal 55, and immediately proceed to Mode V.

Mode V provides for circulating new regenerant acid 68 from tank T2 through IEX column 29 (see arrow 6), for completing the regeneration of the resin 30 contained in IEX column 29 by removing metal ions from the resin 30. If the embodiment of the invention for including a used acid tank T3, for using once used acid 113 for the initial regeneration of the resin 30 in IEX column 29 is not used, Mode V of operation is entered into immediately after Mode III, and the regenerant acid 68 from tank T2, after passing through IEX column 29, is discharged from the system for treatment. The steps for Mode V of operation are as follows:

1. Generate control signal 52 for opening valve AV3.
2. Generate control signal 54 for opening valve AV5.
3. Generate control signal 57 for opening valve AV8.
4. Generate control signal 62 for energizing pump P3, for circulating fresh regenerant acid 68 from tank T2 through IEX column 29 in a downflow direction (see arrow 6).
5. Monitor signal SIN2 for counting the number of strokes of pump P3 for determining when a predetermined quantity of new regenerant acid 68 has been passed through IEX column 29 and discharged from tee coupling 37 for waste treatment at which time terminate control signal 62 for turning off pump P3.
6. Reset stroke counter 44.
7. Terminate control signal 52 for closing valve AV3.
8. Terminate control signal 54 for closing valve AV5.
9. Continue to generate control signal 57 to keep valve AV8 open.

Mode VI-A is provided via programming controller 127 for rinsing IEX column 29 in a downflow direction 6 with DI water, and discharging the rinse water from the system for waste treatment. If the embodiment of the invention for including a used acid tank T3, and for using once used acid 113 for the initial regeneration of the resin 30 in IEX column 29 is used, the solution initially discharged from the IEX column, after an initial downflow rinse with DI water and discharge of the solution to waste treatment, is circulated to tank T3 for refilling the used acid 113 in that tank, whereafter any further rinse solution circulated through IEX column 29 is discharged for waste treatment. Mode VI-A includes the following steps:

1. Generate control signal 56 for opening valve AV7.
2. Generate control signal 62 for turning on pump P3.
3. Perform steps 8 and 9 of Mode III.
4. Reset stroke counter 44.
5. Go to step 14 if the preferred embodiment including tank T3 for permitting the use of once used acid 113 is not employed, otherwise go to the next step.
6. Generate control signal 59 for opening valve AV10.
7. Generate control signal 62 for energizing pump P3.
8. Monitor signal SIN2 for counting the number of strokes of pump P3, for monitoring the quantity of DI water being pumped therethrough.
9. Monitor level signals 70 and 71 for sensing the level of DI water 2 in tank T1.
10. If level signal 71 becomes not energized for at least three minutes before a predetermined quantity of DI water has passed through IEX column 29, terminate control signal 62 for turning off pump P3, and generate control signal 63 for turning on valve SV11 for refilling tank T1 with DI water, until level signal 70 goes "HIGH" whereafter control signal 63 is terminated, and control signal 62 regenerated for turning pump P3 back on for the remainder of the rinse cycle.
11. Monitor liquid level signals 75, 76, and 77 for tracking the level of used acid in tank T3.
12. Terminate control signal 62 for turning off pump P3 either upon detecting level control signal 75 becoming energized, indicating tank T3 is full with once-used acid 113, or upon counting a predetermined number of strokes of pump P3 indicative of a predetermined quantity of used regenerant acid having been passed from IEX column 29 to tank T3.
13. When tank T3 has been refilled with used acid 113, terminate control signal 59 for closing valve AV10.
14. Generate control signal 52 for opening valve AV3 to change destination of solution to waste treatment.
15. Generate control signal 62 for energizing pump P3.
16. Continue to monitor stroke signal SIN2 for accumulating additional stroke counts for pump P3.
17. Terminate control signal 62 to pump P3 after a predetermined quantity of DI water 2 has passed through IEX column 29 in a downflow direction, and therefrom to waste treatment.
18. Terminate control signals 52 and 57 for closing valves AV3 and AV8 to conclude downflow rinsing Mode VI-A. Note that valve AV7 is left open in preparation for Mode VI-B.

Mode VI-B is provided via controller 127 for rinsing IEX column 29 in an upflow direction 8 with DI water, and discharging the rinse water from the system for waste treatment. This upflow flushing operation is performed at a predetermined velocity for the flow of DI water to fluidize the ion exchange resin 30 in the IEX column 29, for substantially removing foreign particulate material from IEX column 29. In this manner, plugging of the IEX column 29 by the buildup of the foreign particulate material over a number of subsequent cycles of operation is prevented. Note that in an engineering prototype of the system, a top diffuser of IEX column 29 was modified to have more porous and open, yet tortuous fluid paths, for insuring that coagulated latex material passes through and out of the IEX column 29, while retaining ion exchange material 30 therein. Mode VI-B includes the following programming steps:

1. Generate control signal 55 for opening valve AV6.
2. Generate control signal 53 for opening valve AV4.
3. Generate control signal 62 for energizing pump P3.
4. Monitor signal SIN2 for counting the number of strokes of pump P3, for monitoring the quantity of DI water being pumped therethrough
5. Monitor level signals 70 and 71 for sensing the level of DI water 2 in tank T1.
6. If level signal 71 goes to zero volt, for example, before a predetermined quantity of DI water has passed through IEX column 29, terminate control signal 62 for turning off pump P3, and generate control signal 63 for turning on valve SV11 for refilling tank T1 with DI water, until level signal 70 goes to +5 volts whereafter control signal 63 is terminated, and control signal 62 regenerated for turning pump P3 back on for the remainder of the rinse cycle.
7. Terminate control signal 62 after a predetermined quantity of DI water 2 has passed through IEX column 29.
8. Terminate control signals 55, 53, and 56, for turning off valves AV6, AV4, and AV7, respectively.

In the preferred embodiment of the invention, four additional modes of operation, Modes VI-C, -D, -E, and -F are successively carried out for additional downflushing, upflushing, downflushing, and then upflushing, respectively, IEX column 29 with DI water, to insure it is free of contaminants.

Mode VI-C includes the following steps:

1. Generate control signal 57 to open valve AV8.
2. Perform steps Mode VI-A steps "1" and "14" through "18", whereas the last step "18" is now preparatory for Mode VI-D.

Mode VI-D is carried out by repeating Mode VI-B steps "1" through "8".

Mode VI-E is carried out by repeating VI-C in entirety.

Mode VI-F is carried out by repeating Mode VI-B steps "1" through "8".

The bath stabilization modes of operation, specifically Modes I through VI, provide one complete cycle of treatment of the coating composition 1 for removing metal ions therefrom, and for regenerating the resin 30 in IEX column 29. Controller 127 can be programmed in an automatic mode of operation for periodically repeating these Modes I through VI, for stabilization of coating composition bath 1. Table 1, shown below, illustrates the Modes for optimal processing in an engineering prototype of the present invention.

TABLE 1

| Mode | Steps | Strokes for Pump | Volume Pumped Gal | Flow Rate GMP | Time MIN | PROCESS | PUMP | Automatic Valve (AV) Open | Throttle Valve (TV) Adjust |
|---|---|---|---|---|---|---|---|---|---|
| II | 1-8 | 600 | 9.6 | 3-5 | 2.4 | BATH ↓ COL → DRAIN | P-1 | 1,3 | TV4 |
| II | 9-17 | 12500 | 200.0 | 3-5 | 45.0 | BATH ↓ COL → BATH | P-1 | 1,2 | TV2 |
| IIIA | 1-5 | 2 | — | — | — | WATER ↓ COL → BATH | P-3 | 2,7,8 | — |
| IIIA | 6-10 | 2600 | 41.6 | 1.5-2.5 | 17.4 | WATER ↓ COL → DRAIN | P-3 | 3,7, 8 | TV3 |
| IIIB | 1-5 | 1800 | 28.8 | 1.5-2.5 | 12.0 | WATER ↑ COL → DRAIN | P-3 | 4,6,7 | TV1 |
| IV | 1-10 | 995 | 15.9 | 1.5-2.5 | 6.6 | REUSE REGEN ↓ COL → DRAIN | P-3 | 3,8,9 | TV3 |
| V | 1-8 | 750 | 12.0 | 1.5-2.5 | 5.0 | FRESH REGEN ↓ COL → DRAIN | P-3 | 3,5,8 | TV3 |
| VIA | 1-5 | 930 | 14.9 | 1.5-2.5 | 6.2 | WATER ↓ COL → DRAIN | P-3 | 3,7,8 | TV3 |
| VIA | 5-13 | 1100 | 17.6 | 1.5-2.5 | 7.3 | WATER ↓ COL → REUSE TANK | P-3 | 7,8,10 | TV3 |
| VIA | 14-18 | 2000 | 32.0 | 1.5-2.5 | 13.4 | WATER ↓ COL → DRAIN | P-3 | 3,7,8 | TV3 |
| VIB | 1-8 | 400 | 6.4 | 1.5-2.5 | 3.0 | WATER ↑ COL → DRAIN | P-3 | 4,6,7 | TV1 |
| VIC | 1-2 | 100 | 1.6 | 1.5-2.5 | 0.7 | WATER ↓ COL → DRAIN | P-3 | 3,7,8 | TV3 |
| VID | 1-8 | 400 | 6.4 | 1.5-2.5 | 3.0 | WATER ↑ COL → DRAIN | P-3 | 4 6, 7 | TV1 |
| VIE | 1-2 | 100 | 1.6 | 1.5-2.5 | 0.7 | WATER ↓ COL → DRAIN | P-3 | 3,7,8 | TV3 |
| VIF | 1-8 | 2850 | 45.6 | 1.5-2.5 | 19.0 | WATER ↑ COL → DRAIN | P-3 | 6,7 | TV1 |

Note that in the Mode II programming for circulating coating composition 1 through IEX column 29 for removal of metal ions therefrom, depending upon the particular system requirements, controller 127 can be programmed to either pass a predetermined quantity of coating composition 1 through IEX column 29, before proceeding to Mode III, or the programming can be such to provide for the system circulating coating composition 1 through IEX column 29 until such time that the differential between conductivity signals C1 and C2 reduces to a predetermined level, whereafter Mode II is terminated and Mode III is then initiated. Similarly, in the Mode VI operation, controller 127 can be programmed to either rinse IEX column 29 with a predetermined quantity of DI water 2, or to continue alternate downflow and upflow rinsing of IEX column 29 with DI water 2 until the conductivity signal C3 reduces to a predetermined minimum value, indicating that no residual regenerant acid 68 or 113 remains in the IEX column 29. It is particularly important to insure that IEX column 29 is completely rinsed and cleared of all residual acid, in that high concentrations of remaining acid therein will cause the coating composition 1 to coagulate within IEX column 29, clogging the system. Also, in practice, following regeneration of IEX column 29, optimum operation was obtained by using six flushing cycles of alternating downflow and upflow rinsing, as shown in Table 1.

The controller 127 is also programmed to provide a mode of operation for testing for multiple types of alarms. Note that the programming is such that the test programs can only be run if the system control switch SW3 is in either its "AUTO" or "PB START" position. There are eight different test modes, most of which require manual operations in addition to automated operation.

In the engineering prototype system for the present invention, tank T1 is 90 gallons, tank T2 is 140 gallons, tank T3 is 30 gallons, and tank T4 is capable of containing at least 27,000 pounds of coating composition 1, requiring at least a 3,000 gallon tank. The size of tank T4 is also partly dictated by the size of the workpieces to be coated with coating composition 1, and the production rate desired in actual practice. In the prototype system, steel workpieces are immersed in the coating composition bath 1 for given periods of time to coat the workpieces. As a result, after a period of use, iron begins to build up in the coating composition, causing excess metal ions therein.

Manual titration measurements of the coating composition bath 1 may be periodically made in order to determine when to initiate the treatment cycle of the coating compound for removing a portion of the metal ions. When the titration measurement reaches a predetermined level associated with the particular coating composition used, and the metal ions involved, such as iron, zinc, or chromium, for example, the treatment cycle is initiated. Also, in certain applications titration measurements may not be required. In such applications, the starting point for initiating a treatment cycle may be determined on a time basis relative to the extent of use of the coating composition bath 1 for coating a given quantity of a particular metal.

In the preferred embodiment of the invention, the choice of resin 30 for use in IEX column 29 is particularly critical. The resin 30 chosen as indicated above permits the system to handle a latex-based coating composition which is normally prone to coagulate and clog known systems. The present system is able to pass the entire composition plus electrolyte through IEX column 29 for removing metal ions, with substantially minimal coagulation of the latex compounds in the coating composition 1.

In the treatment process for removing metal ions from the coating composition bath, the system releases hydrofluoric acid back into the coating composition 1, thereby helping to maintain a more constant level of HF in the coating composition bath 1. The measurement of HF in the coating composition bath 1 is for maintenance of the bath itself by an operator, and is not involved for indicating when the coating composition bath 1 must be treated for iron removal, for example.

An example of typical operation of the present system will now be described. The "REGENERATION PUMP" switch SW1 is rotated to the "AUTO" position, the "PAINT PUMP" switch SW2 is rotated to its "AUTO" position, the "SYSTEM CONTROL" switch SW3 is rotated to its "PB START" position, the "REGEN CHEMICAL PUMP" switch SW4 is placed in its "AUTO" position, and the "DI MAKE-UP" switch SW6 is rotated to its "AUTO" position. During this example of operation of the system, the regenerant acid tank T2 is refilled.

When the system is operating normally, all of the red alarm lights are "OFF", as are the associated backlit displays, if used. These include lamps 160 through 167, lamp 169, and backlit displays 160' through 167', and 169'. If an alarm condition occurs, causing one of these lamps to be energized or lit, corrective action as described above for various alarm or test conditions should be taken to remove all such alarm conditions before initiating a next cycle of operation, or completing an interrupted cycle of operation.

The coating composition bath 1 is, in this example, maintained at a particular HF concentration. The concentration is monitored manually through use of a Lineguard 101 Meter (Manufactured by Henkel Corporation, Parker+Amchem, Madison Heights, Mich.). As previously mentioned, to determine when to initiate a cycle of bath stabilization for removing metal ions from the coating composition bath 1, periodic testing of the bath by taking titration measurements can be conducted. Alternatively, an analysis can be made in a repetitive production facility, to obtain the area of workpieces coated on a daily basis, the length of time the workpieces are kept in the coating composition bath 1, and so forth, for determining the rate at which iron (in this example) or other metallic ions enter the paint or coating composition bath 1. In the example given for the prototype system of the present invention, each cycle of operation for removing metal ions from the coating composition bath typically removes between one and one and a half pounds of iron.

For the previously described system switch settings, when a bath stabilization cycle is to be initiated, an operator merely pushes the "START CLEAN-UP SEQUENCE" switch SW7 to begin Mode II operation, as described above. Also, as previously indicated, the system can be placed into a completely automatic mode of operation, for automatically entering into a bath stabilization cycle on a desired periodic schedule. Note that as the paint or coating composition 1 is circulated through the IEX column 29, the pH of the liquid discharging from IEX column 29 is typically slightly lower than the pH of the liquid entering IEX column 29. As a result, this reaction balances the acidity lost due to metal dissolution and metal oxidation in the coating composition bath 1 during use.

Note that during Mode II of operation, coating composition 1 flows downward through IEX column 29 as indicated by arrow 6. Typically the resin material 30 in the IEX exchange column 29 is in the form of beads, for providing a maximum surface area for the coating composition 1 to contact as it flows downward through the resin material 30. In the present example for coating steel workpieces, the metallic ions that must be removed are $Fe^{+3}$. These ions are exchanged in the ion exchange column 29 via the resin 30 for $H^+$, and the Fe depleted coating composition 1 is directly returned to tank T4, as indicated above. When the resin 30 in IEX column 29 is exhausted, Mode III is initiated for rinsing IEX column 29 with DI water, for displacing any coating composition bath 1 left in IEX column 29. In this example, IEX column 29 is next regenerated in at least Mode V, and in some applications via Modes IV and V. The resin 30 is regenerated with approximately 2% HF acid.

The present system prevents metal ions, such as iron in this example, from increasing in concentration in the coating composition bath 1 to a level negatively affecting the coatings applied to workpieces, and/or causing the latex of the coating composition 1 to coagulate. Through use of the present invention, the metal ions such as iron, for example, are separated from the latex using immobilized chelants, as represented by the example of resin 30 used in IEX column 29. Through use of the present invention, latex losses are substantially eliminated relative to prior coating deposition systems.

Although various embodiments of the present invention are shown and described herein, they are not meant to be limiting. Those of skill in the art may recognize modifications to these embodiments, which modifications are meant to be covered by the spirit and scope of the appended claims. For example, as indicated above, the present system is not limited to use with autodeposition processes involving polymer, but can be used to remove metal ions from many types of chemical baths. Also, although Mode VI-B is preferred for use when chemical bath 1 is an autodeposition bath containing latex and polymers, this mode may not be required when other types of chemical baths are treated.

What is claimed is:

1. A system automated for providing at least periodic removal of metal ions and contaminants from a chemical bath comprising a latex solution containing charged latex particles, and having an acidic pH to form a coating by autodeposition, said system comprising:

a first tank containing said chemical bath;

an ion exchange (IEX) column containing ion exchange material for removing metal ion contaminants from said chemical bath;

first circulating means responsive to first control signals for drawing chemical bath from said first tank, passing it through said IEX column, and returning treated chemical bath from said IEX column back to said first tank;

first conductivity measurement means positioned in said chemical bath in said first tank, for providing a first conductivity signal indicative at the conductivity of said chemical bath;

second conductivity measurement means immersed in said chemical bath being returned from treatment in said IEX column to said first tank, for providing a second conductivity signal indicative of the conductivity of treated chemical baths; and controller means programmed in a first state of operation for producing said first control signals, and during the resultant circulation or said chemical bath, sensing the differential between said first and second conductivity signals reducing to a predetermined minimum value, for terminating said first control signals to turn off said first circulating means;

a second tank containing deionized water (DI water);

second circulating means responsive to second control signals for pumping a predetermined quantity of DI water into said IEX column, for displacing residual chemical bath, and returning the displaced chemical bath to said first tank;

said controller means being programmed in a second state of operation following said first state, for producing said second control signals for a requisite period of time;

a waste port for discharging waste products from said system for treatment;

third and fourth circulation means responsive to third and fourth control signals, respectively, for pumping DI water from said second tank, through said IEX column alternately in one direction and an opposite direction, respectively, for rinsing the latter, and therefrom discharging the DI water from said waste port;

said controller means being programmed in third and fourth states or operation following said second state, for sequentially producing said third and fourth control signals for predetermined periods of time, respectively;

first filter means between said first tank and an input port of said IEX column, for removing solid particulates including coagulated latex and debris from said chemical bath, while permitting uncoagulated particles of said latex solution to pass through to said IEX column;

a third tank containing chemical regenerant; and fifth circulation means responsive to fifth control signals, for pumping chemical regenerant from said third tank, through said IEX column, and therefrom discharging the chemical regenerant from said waste port, thereby removing metal ions from said ion exchange material, for regenerating the same;

said controller means being programmed in a fifth state of operation following said fourth state, for producing said fifth control signals for a requisite period of time;

said controller means being programmed in a sixth state of operation following said fifth state of operation, for sequentially producing said third and fourth control signals for respectively predetermined periods of time, in a repetitive manner, for alternately rinsing said IEX column with DI water in said one and opposite directions at least three times in each direction, to remove residual chemical regenerant and contaminants therefrom.

2. The system of claim 1, wherein said ion exchange material comprises an iminodiacetate ion exchange resin.

3. The system of claim 1, wherein at least one of said third and fourth circulation means further includes:

means for fluidizing said ion exchange material within said IEX column.

4. The system of claim 1, further including:

third conductivity means positioned within said waste port, for providing a third conductivity signal indicative of the conductivity of fluids being discharged through said waste port; and said controller means being programmed in a fifth state of operation following said fourth state, for both producing said third control signals to initiate a second rinse cycle for said IEX column, and sensing said third conductivity signal reducing to a predetermined value for terminating said third control signals.

5. The system of claim 1, wherein said first circulating means further includes:

second filter means between an output port of said IEX column and said first tank, for removing ion exchange material fines and other solid particulates from treated said chemical bath before it is returned to said first tank.

6. The system of claim 5, further including:

first pressure sensing means connected across inlet and outlet ports of said first filter means, for producing a first clog signal if the pressure across said first filter exceeds a predetermined value; and said controller means further being programmed to respond to said first clog signal by permitting the first state of operation to be completed, and thereafter inhibiting further operation of said system until said first filter is replaced.

7. The system of claim 6, further including:

second pressure sensing means connected to an outlet port of said second filter means, for producing a second clog signal if the outlet pressure of said second filter means decreases to a predetermined minimum value; and said controller means further being programmed to respond to said second clog signal by permitting the first state of operation to be completed, and thereafter inhibiting further operation of said system until said first filter is replaced.

8. A system automated for providing at least periodic removal to metal ions and contaminants from a chemical bath comprising a latex solution containing charged latex particles, and having an acidic pH to form a coating by autodeposition, said system comprising:

a first tank containing said chemical bath;

an ion exchange (IEX) column containing ion exchange material for removing metal ion contaminants from said chemical bath;

first circulating means responsive to first control signals for drawing chemical bath from said first tank, passing it through said IEX column, and returning treated chemical bath from said IEX column back to said first tank;

first conductivity measurement means positioned in said chemical bath in said first tank, for providing a first conductivity signal indicative of the conductivity of said chemical bath;

second conductivity measurement means immersed in said chemical bath being returned from treatment in said IEX column to said first tank, for providing a second conductivity signal indicative of the conductivity of treated chemical bath;

controller means programmed in a first state of operation for producing said first control signals, and during the resultant circulation of said chemical bath, sensing the differential between said first and second conductivity signals reducing to a predetermined minimum value, for terminating said first control signals to turn off said first circulating means;

a second tank containing deionized water (DI water);

second circulating means responsive to second control signals for pumping a predetermined quantity of DI water into said IEX column, for displacing residual chemical bath, and returning the displaced chemical bath to said first tank;

said controller means being programmed in a second state of operation following said first state, for producing said second control signals for a requisite period of time;

a waste port for discharging waste products from said system for treatment;

first filter means between said first tank and an input port of said IEX column, for removing solid particulates including coagulated latex and debris from said chemical bath, while permitting uncoagulated particles of said latex solution to pass through to said IEX column;

third and fourth circulation means responsive to third and fourth control signals, respectively, for pumping DI water from said second tank, through said IEX column in one direction and an opposite direction, respectively, for rinsing the latter, and therefrom discharging the DI water from said waste port;

said controller means being programmed in a third state of operation following said second state, for alternately and sequentially producing said third and fourth control signals for predetermined periods of time;

a third tank containing fresh chemical regenerant;

a fourth tank containing once used chemical regenerant;

fifth circulation means responsive to fifth control signals, for pumping a predetermined quantity of once used chemical regenerant from said fourth tank, through said IEX column, and therefrom discharging the regenerant from said waste port, thereby at least partially regenerating said ion exchange material;

sixth circulation means responsive to sixth control signals, for pumping fresh chemical regenerant from said third tank, through said IEX column, and herefrom discharging the once used chemical regenerant from said waste port;

seventh circulation means responsive to seventh control signals, for pumping DI water from said second tank, into said IEX column in said one direction, for displacing once used chemical regenerant therefrom into said fourth tank;

said controller means being programmed in a fourth state of operation for producing said fourth control signals, for a requisite period of time;

said controller means being programmed in a fifth state of operation for producing said fifth control signals, for a period of time necessary for completing the regeneration of said ion exchange material;

said controller means being programmed in a six state of operation for producing said sixth control signals subsequent to said fifth control signals, for a period or time necessary for either falling or passing a predetermined quantity of once used regenerant chemical into said fourth tank; and said controller means being programmed in a seventh state of operation, for sequentially producing said third and fourth control signals for respective predetermined periods of time for alternately rinsing said IEX column in said one and opposite directions at least three times in each direction, to remove residual chemical regenerant and contaminants therefrom.

9. The system of claim 8, wherein said ion exchange material comprises an iminodiacetate ion exchange resin.

10. The system of claim 8, wherein at least one of said third and fourth circulation means further includes:

means for fluidizing said ion exchange material within said IEX column.

11. The system of claim 8, further including:

second filter means connected between said first tank and said IEX column in the series fluid circuit also including said first valve means, for filtering said chemical bath after treatment through said IEX column, and before it returns to said first tank.

12. The system of claim 11, further including:

first and second pressure sensing means connected to said first and second filters, respectively, for producing respective pressure signals indicative of the operating condition of said first and second filters, respectively;

said controller means being responsive to said pressure signals from said first and second pressure sensing means, for generating a first clogging signal if the differential pressure across said first filter increases above a predetermined magnitude, and a second clogging signal if outlet pressure at said second filter decreases to below a predetermined magnitude;

alarm means responsive to said first and second clogging signals, for both generating individual alarms indicative of clogging of said first and second filters, respectively; and said controller means being further responsive to said pressure signals, for completing either of said first and second states of operation that may be in progress, and for thereafter inhibiting further operation of said system until said first and second filters are both operative.

13. A method for removing metal ions and contaminants from a bath of coating composition used in an autodeposition system, said autodeposition including a first tank for containing deionized water (DI water), a second tank for containing fresh regenerant chemical, a third tank for containing once used regenerant chemical, a fourth tank for containing said coating composition comprising a latex solution containing charged latex particles and having an acidic pH, a waste port from which waste products are discharged, and in ion exchange (IEX) column containing ion exchange material, said method comprising the steps of:

determining when the metal ion concentration in said coating composition increases to a predetermined level;

circulating said coating composition from said fourth tank, through said IEX column, and back to said, fourth tank after treatment;

filtering said coating composition before it enters said IEX column, for removing solid particulates including coagulated latex and debris from said chemical bath, while permitting uncoagulated latex particles of said coating composition to pass through to said IEX column;

determining when a sufficient quantity of said coating composition has been treated for removal of metal ions to decrease the concentration of metal ions to an acceptable level in said coating composition in said fourth tank; and terminating the circulation of said coating composition through said IEX column;

circulating a sufficient amount of said DI water into said IEX column, for displacing residual coating composition therefrom;

passing a portion of the displaced coating composition into said fourth tank;

preventing any further flow of liquid from said IEX column to said fourth tank;

alternately circulating DI water in opposite directions through IEX column;

directing the flow of DI water from said IEX column to discharge out of a waste port;

terminating the circulation of DI water through said IEX column after the latter has been substantially rinsed free of costing composition;

circulating chemical regenerant from said second tank, through said IEX column, and out of said waste port;

sensing when a predetermined quantity of chemical regenerant has passed through said IEX column for regenerating said ion exchange material;

terminating the flow of regenerant chemical through said IEX column;

alternately circulating DI water from said first tank in opposite directions through said IEX column, and out of said waste port; and repeating said alternate circulation in opposite directions at least two more times for rinsing said IEX column to insure substantially all regenerant chemical and foreign particulates are removed therefrom.

14. The method of claim 13, wherein said circulating step further includes fluidizing said ion exchange material in said IEX column in one direction of circulation or flow of said DI water through said IEX column.

15. The method of claim 13, further including immediately before the step of circulating fresh chemical regenerant from said second tank through said IEX column, the steps of:

circulating once used chemical regenerant from said third tank, through said IEX column, and out of said waste port;

sensing when a predetermined quantity of once-used chemical regenerant has passed through said IEX column;

terminating the circulation of once used chemical regenerant; and circulating a predetermined quantity of DI water from said first tank, through said IEX column, and out of said waste port.

16. The method of claim 13, further including the steps of:

preparatory to the step of initiating circulation of said coating composition through said IEX column, circulating a predetermined amount of said coating composition from said fourth tank into said IEX column, for displacing residual DI water therefrom; and circulating the displaced DI water out of said waste port.

17. The method of claim 13, wherein said ion exchange material comprises of an iminodiacetate ion exchange resin.

* * * * *